UNITED STATES PATENT OFFICE.

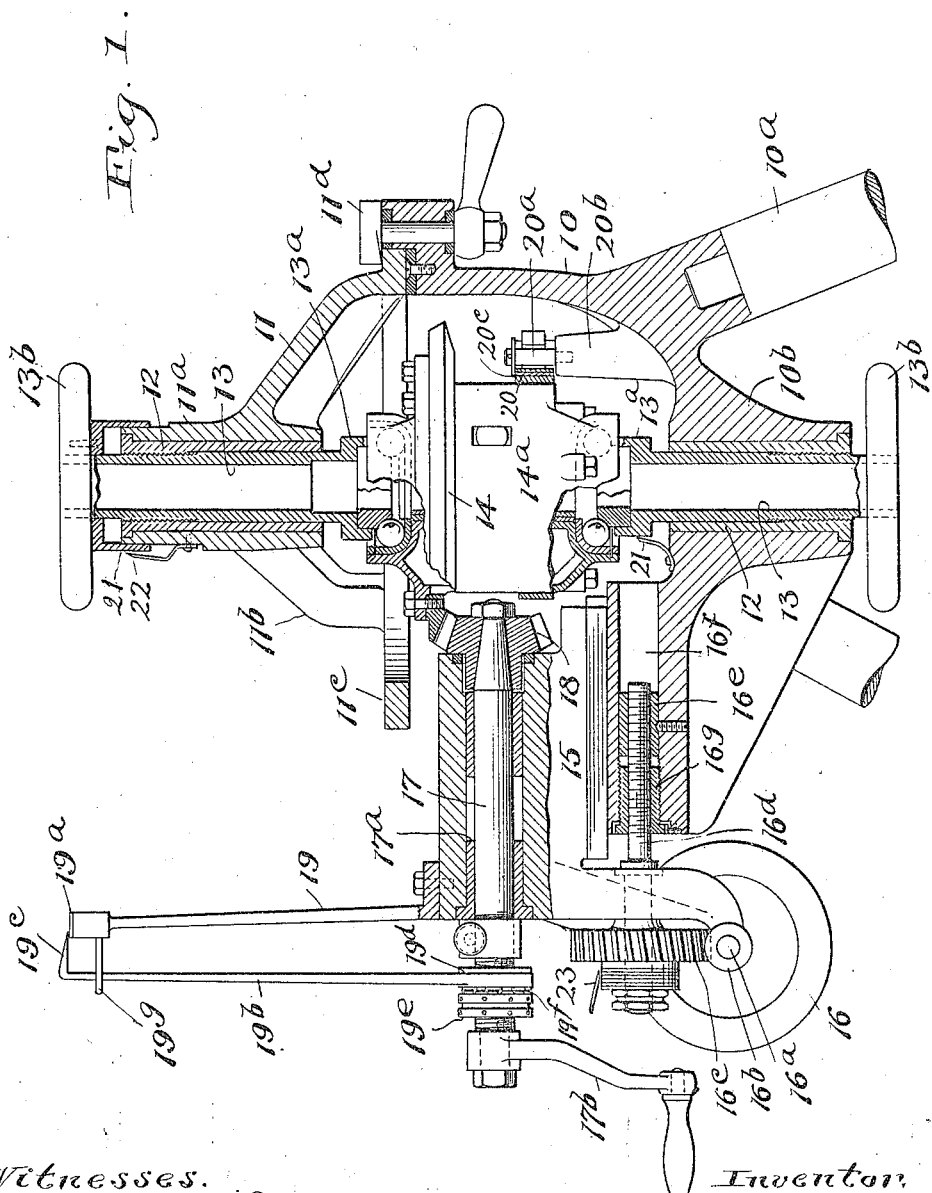

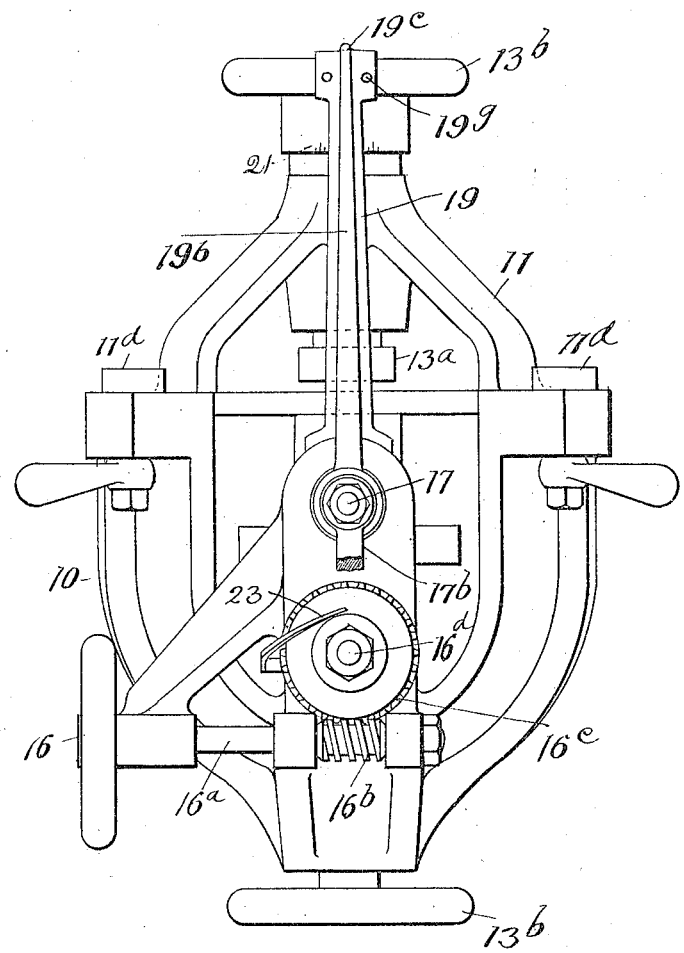

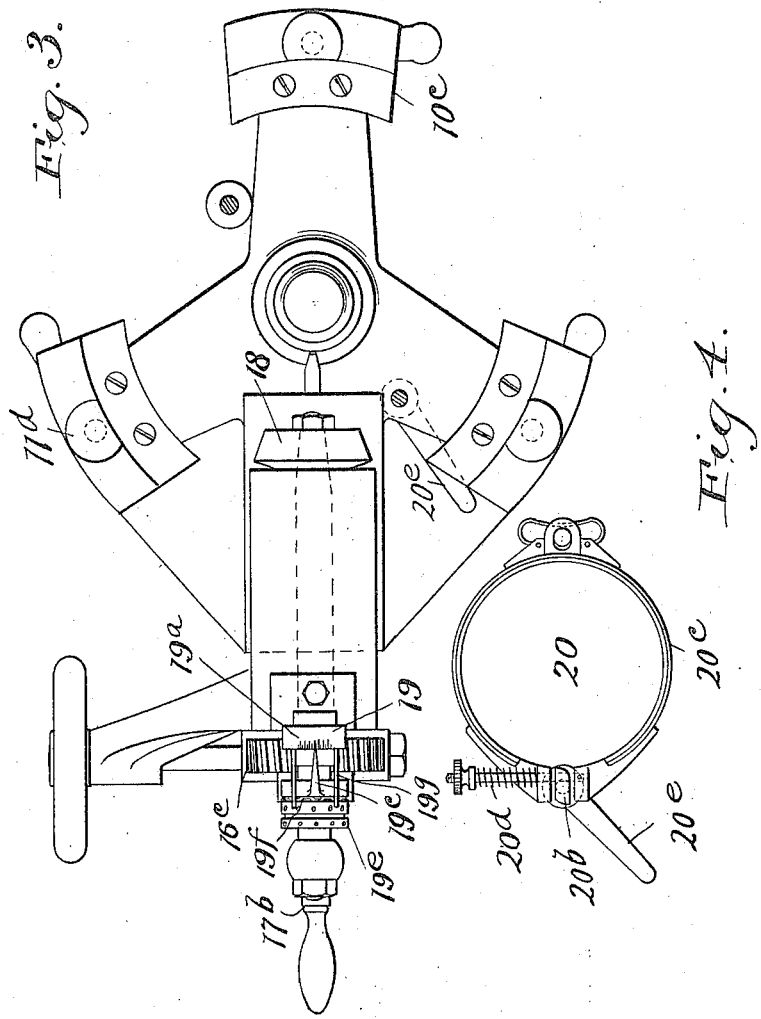

WALTER C. BAKER, OF LAKEWOOD, OHIO.

GAGING-MACHINE.

1,233,014. Specification of Letters Patent. Patented July 10, 1917.

Original application filed June 17, 1910, Serial No. 567,372. Divided and this application filed April 10, 1911. Serial No. 619,990.

*To all whom it may concern:*

Be it known that I, WALTER C. BAKER, a citizen of the United States, residing at Lakewood, in the county of Cuyahoga and State of Ohio, have invented a certain new and useful Improvement in Gaging-Machines, of which the following is a full, clear, and exact description.

This invention relates to a gaging machine, designed especially for use in determining the correct positions of coöperating gears with respect to their position-fixing abutments so as to obtain the best results in power transmission, smoothness of operation, life and durability. The machine is employed particularly for obtaining data or measurements of the positions of the gears with respect to each other when placed in their proper relative positions in the machine, and is utilized in carrying out certain steps of the method for accurately locating coöperating gears forming the subject matter of my prior application, Serial No. 567,372, filed June 17th, 1910,—the present application being a division of said prior application.

The machine as shown in the accompanying drawings and as described below is designed for making certain adjustments and measurements of coöperating bevel gears such as are used in the bevel gear drive of a motor vehicle, but I do not wish to be confined in my claims to a machine adapted for receiving, adjusting and measuring gears of this particular type or used for this purpose.

One of the objects of the invention is to provide a machine having means for receiving and supporting two coöperating gears in driving relation and on temporary axes having the same relation as the permanent axes of the gears, together with means whereby the gears may be readily adjusted toward and away from each other so as to bring them into their correct working positions. Further, the invention aims to provide a machine wherein the adjustments may be very readily and accurately measured so as to determine with great accuracy the locations of the gears or of certain parts thereof relative to the axes of the gears or relative to corresponding parts of standard gears of known accuracy with which the machine may have been previously set or calibrated. A further object is to provide means whereby the gears may be adjusted toward or away from each other and at the same time the extent of back lash or free movement can be measured at any time so as to enable the gears to be placed in the exact relative positions which they will occupy in their permanent relation or on their permanent axes.

These and other objects are accomplished by my invention which may be briefly summarized as consisting in certain novel details of construction and combinations and arrangements of parts which will be described in the specification and set forth in the appended claims.

In the accompanying sheets of drawings, Figure 1 is a vertical sectional view with parts in elevation and parts broken away, of a gaging machine constructed in accordance with my invention, the machine having mounted therein in position for adjustment and measurement the bevel driving pinion and the coöperating driven gear of a bevel gear drive of a motor vehicle; Fig. 2 is an end view of the same looking toward the left of Fig. 1; Fig. 3 is a top plan view of the machine with the top portion thereof removed; and Fig. 4 is a detached view of a friction brake which is employed in the machine and is adapted to be placed about the mounting or hub of the gear when supported in the machine.

The gaging machine includes a frame having a main or body portion 10 and a removable top portion 11, the body being formed from any suitable cast metal and being supported on legs $10^a$. The body 10 is provided with a hub $10^b$ and the removable member 11 includes a hub or central portion $11^a$, a plurality of depending arms $11^b$, and a ring $11^c$ at the lower ends of the arms $11^b$, the ring, arms and hub of this member being preferably cast in one integral piece. This top member 11 is adapted to be clamped to arc shaped bearing and supporting members $10^c$ (see Fig. 3) with the hub $11^a$ above and in vertical alinement with the hub $10^b$, by means of suitable clamping members $11^d$, one of which is best shown in Fig. 1. The hubs $10^b$ and $11^a$ are provided respectively with oppositely disposed vertical openings which receive bushings 12—12 in which are mounted respectively two rotary and axially movable tubular members 13—13 for supporting a bevel gear 14, which, together with the bevel pinion to be referred to presently, constitute one of the pairs or sets of gears which is placed in the machine for adjustment and measurement. The gear 14 is secured to its hub or mounting 14ª which in the present case, in view of the fact that the machine is adapted for receiving the bevel driving pinion and bevel driven gear of the bevel drive of a motor vehicle, consists of the usual differential housing which incloses differential gears, not shown. In order that very accurate results may be obtained with the gaging machine, I prefer that the gear and its mounting be supported in the machine on the same bearings with which the gear will be permanently associated after its removal from the machine and its assembly into the motor vehicle, and for this purpose, the gear and its mountings are supported in the machine on its associated or selected bearings including cups fixed in the ends of the mounting, ball bearings and relatively stationary ball cones on which the balls roll, the supporting members 13—13 having at their inner ends cup shaped portions 13ª which receive the ball cones. Each bushing 12 and its associated gear-supporting member 13 are provided with coöperating threaded portions which cause the member 13 to be fed inward or outward when turned or rotated, and secured to the outer ends of the members 13 are hand wheels 13ᵇ by means of which said members may be turned and adjusted axially. It will be seen that if the members 13 are simultaneously adjusted, the gear 14 and its hub or mounting, together with the bearings for the same, will be shifted as a unit in one direction or the other along the axis of the gear.

The body portion 10 of the machine is also provided with a horizontally movable slide 15 which is adapted to be shifted in suitable grooves or guides in a direction toward or away from the gear supporting members 13, 13, by suitable mechanism including a hand wheel 16 which is fixed to a short shaft 16ª having a worm or other gear wheel 16ᵇ which meshes with a gear 16ᶜ mounted upon a horizontal spindle 16ᵈ. This spindle is supported in a suitable bushing 16ᵉ arranged in an opening 16ᶠ of the body 10 and has a threaded portion which coöperates with a nut 16ᵍ fixed in said opening 16ᶠ. With this mechanism, by turning the hand wheel 16, the slide 15 will be shifted inwardly or outwardly, depending upon the direction in which the hand wheel is turned. This slide carries a spindle 17 which is adapted to be moved inwardly or outwardly with the slide and is supported in suitable bearing bushings 17ª so that it may be rotated with respect to the slide. This spindle which is arranged at right angles to the gear-supporting members 13, 13 and with its axis intersecting the common axis of said gear-supporting members is adapted to have secured to its inner end a bevel driving pinion 18 which coöperates with the bevel gear 14, the gear 14 and the pinion 18 constituting as before stated one of the pairs of gears which are placed in the machine, adjusted and measured.

The gear 14 and pinion 18 are supported in the machine with their teeth in driving engagement so that if the spindle 17 is rotated by means of a crank 17ᵇ secured to its outer end, the pinion and gear will be rotated. The purpose of mounting the pinion 18 upon the rotary spindle is to enable the operator to determine at any time the back-lash between the gears by turning the spindle back and forth so as to swing or rock the pinion relative to the gear, and also to determine whether or not there are any imperfections or irregularities in the teeth of either of the gears, by rotating the gears under a load provided by a brake to be referred to.

In order that the extent of back-lash may be determined at any time, I employ a back-lash indicating device including an arm 19 fixed to the slide 15 and provided at its outer end with a graduated scale 19ª (see Fig. 3), and an indicator consisting of an arm 19ᵇ having at its outer end a pointer 19ᶜ and at its inner end a hub which is held yieldingly against a shoulder 19ᵈ of the spindle by means of an adjustable nut 19ᵉ, and a spring washer 19ᶠ arranged between the nut and the hub of the arm 19ᵇ. The arm 19ᵇ has a limited range of movement with the spindle 17, the extent of movement being fixed by a pair of pins 19ᵍ near the outer end of the arm 19, and the hub of the arm is held against the shoulder 19ᵈ by pressure sufficient to cause the arm 19ᵇ to turn with the spindle—if the spindle is turned back and forth through a slight arc—and to permit the spindle and the gears to be rotated freely or through any number of complete revolutions, the arm 19ᵇ being then held against movement by one of the pins 19ᵍ.

In order that the extent of back-lash and the existence or non-existence of irregularities in the teeth of the gears can be determined, it is desirable that a load or drag be placed on the gear 14 and therefore I utilize a brake 20,—a detached view of which is shown in Fig. 4,—the brake being mounted upon an anchor stud 20ª supported upon a boss 20ᵇ shown in Fig. 1. The brake includes an annular band 20ᶜ adapted to be placed about the hub or mounting 14ª of the gear 14, and to be held in engagement with the same by a tension device 20ᵈ. The band may be opened or spread by a handle 20ᵉ to which is attached a cam or spreading member 20ᶠ.

With this mechanism, the condition of the gears can be determined quite accurately, for, by rapidly turning the gears by means of the crank 17ᵇ, the operator can judge by the "feel" transmitted through the spindle and crank whether the gears run smoothly and are perfect gears, or whether any imperfections or irregularities exist. Furthermore, by rocking or turning the spindle 17, the pinion 18 and indicating arm 19ᵇ through a slight arc, while the gear 14 is held from movement by the brake, the actual extent of back-lash can be determined at any time.

Thus it will be seen that with the gaging machine so far described, by shifting the supporting members 13—13 simultaneously in one direction or the other, the gear 14, together with its mounting will be shifted upwardly or downwardly so as to move the gear away from or toward the coöperating pinion 18, and by turning the hand wheel 16, the pinion can be shifted inwardly or outwardly toward or away from the gear 14. By properly adjusting the gear and pinion along their respective axes in the manner above described, the proper or correct working positions of the pinion and gears can be found, the latter being determined largely by the smooth and silent action of the gears when rotated, and by means of the back-lash indicating means which may be brought into use from time to time as the adjustments are being made.

In order that the extent of the vertical adjustment of the gear and its mounting and bearings and the extent of the horizontal adjustment of the pinion can be determined and accurately measured, preferably in terms which can be utilized for determining the positions of the gears relative to their respective fixed abutments, I have provided for the gear supporting members 13, 13 micrometer measuring devices 21 and 22, and for the horizontally movable slide which carries the spindle 17, I have provided a micrometer measuring device 23. Each of these micrometer measuring devices consists of a suitably graduated movable part and a fixed indicator, the movable portions of the measuring devices 21 and 22 being mounted upon and movable respectively with the gear supporting members 13, 13, and the movable part of the member measuring device 23 for the slide 15 being carried by the spindle 16ᵈ. These micrometer measuring devices are originally so calibrated and adjusted that when the gear and pinion have been adjusted and placed in their correct working positions, the readings of the measuring devices will indicate the positions of the gear ends or rather of the ball cones with reference to the pinion axis and of the pinion 18 with reference to the gear axis. Preferably, the measuring devices are originally set by first placing in the machine two standard gears of known accuracy, and when said gears are in their proper positions, by giving to these measuring devices readings such that the differences between the readings and the measurements of the corresponding position-fixing abutments for said gears will be positive, as explained more fully in my prior application above referred to. These readings will then represent the distances of the gear cones from the pinion axis and the distance of the end of the pinion from the gear axis. The readings for any other set of gears will then bear a fixed relation to or will indicate the positions of the corresponding ball cones with reference to the axis of the associated pinion, and the position of the pinion with reference to the gear axis, and will also indicate the positions of the ball cones and of the pinion with respect to the positions of the ball cones and the pinion of the set of gears of known accuracy.

Having thus described my invention, what I claim is:

1. In a gaging machine, a frame provided with members for supporting respectively two gears in driving relation, means for adjusting said members so as to move the gears toward and away from each other, and means for measuring the extent of the adjustments.

2. In a gaging machine, a frame provided with members for supporting two gears in driving relation, means whereby said members may be adjusted so as to move the gears toward and away from each other, and measuring devices connected to said supporting members for indicating the relative positions of said gears.

3. In a gaging machine, a frame having members for supporting two gears in driving relation, means whereby said members may be adjusted in axial directions, means for turning one of said members so that the gears may be rotated, and measuring devices connected to said members for indicating the positions of the gears.

4. In a gaging machine for two coöperating gears, a frame provided with means for supporting the two bevel gears in driving relation, said supporting means for each gear being adjustable in the direction of the axis of its gear and the member for directly supporting one of the gears being rotatably mounted so that it may be rotated independently of its axial adjustment, and a friction brake coöperating with one of said gears.

5. A gaging machine for two coöperating gears comprising a frame having means for supporting the bevel gears in driving relation, the supporting means for each gear being adjustable in the direction of the axis of its gears, and the member for directly supporting one of the gears being rotatably mounted so that by turning the same, the gears may be turned, and a back lash indicating device connected to said last named gear supporting means.

6. A gaging machine for two coöperating gears comprising a frame having means for supporting the bevel gears in driving relation, the supporting means for each gear being adjustable in the direction of the axis of its gear, and the member for directly supporting one of the gears being rotatably mounted so that by turning the same, the gears may be turned, a back lash indicating device connected to said last named gear supporting means, and a fraction brake coöperating with one of said gears.

7. A gaging machine for a pair of coöperating gears comprising a frame having a pair of oppositely disposed axially movable members for supporting one of the gears, a rotary and axially movable spindle adapted to support the other gear, said spindle being arranged at right angles to the supporting members for the first named gear, means for adjusting the supports for the two gears in axial directions so that the gears may be moved toward and away from each other, and measuring devices associated with said supporting members.

8. In a gaging machine for two coöperating gears, a frame provided with a pair of axially movable oppositely disposed members for supporting one of the gears, a slide arranged for movement toward and away from the said supporting members, a rotary spindle carried by said slide and constituting a support for the other gear, means for adjusting said oppositely disposed supporting members, and means for adjusting said slide so as to move the gears toward and away from each other.

9. In a gaging machine for two coöperating gears, a frame provided with a pair of axially movable oppositely disposed members for supporting one of the gears, means for supporting the other gear comprising a slide arranged for movement toward and away from the said supporting members, and a rotary spindle carried by said slide and adapted to have said other gear secured thereto, means for adjusting said oppositely disposed supporting members, means for adjusting said slide so as to move the gears toward and away from each other, and measuring devices associated with the gear supporting members.

10. In a gaging machine for two coöperating gears, a frame provided with a pair of axially movable oppositely disposed members for supporting one of the gears, a slide arranged for movement toward and away from the said supporting members, a spindle carried by said slide and constituting a support for the other gear, means for adjusting said oppositely disposed supporting members, means for adjusting said slide so as to move the gears toward and away from each other, means for turning the spindle in the slide, and measuring devices coöperating with said oppositely disposed supporting members and with said slide for indicating the relative positions of the gears.

In testimony whereof, I hereunto affix my signature in the presence of two witnesses.

WALTER C. BAKER.

Witnesses:
H. R. SULLIVAN,
A. F. KWIS.